United States Patent
Defrance et al.

(10) Patent No.: US 9,071,789 B2
(45) Date of Patent: Jun. 30, 2015

(54) METHOD AND DEVICE FOR STORING STREAM DATA SUCH AS DIGITAL VIDEO AND NON-STREAM DATA

(75) Inventors: Serge Defrance, Rennes (FR); Claude Chapel, Rennes (FR); Gael Mace, Langan (FR)

(73) Assignee: Thomson Licensing, Issy-les-Moulineaux (FR)

( * ) Notice: Subject to any disclaimer, the term of this patent is extended or adjusted under 35 U.S.C. 154(b) by 1001 days.

(21) Appl. No.: 10/398,817

(22) PCT Filed: Oct. 5, 2001

(86) PCT No.: PCT/EP01/11532
§ 371 (c)(1),
(2), (4) Date: Apr. 9, 2003

(87) PCT Pub. No.: WO02/33586
PCT Pub. Date: Apr. 25, 2002

(65) Prior Publication Data
US 2004/0101281 A1    May 27, 2004

(30) Foreign Application Priority Data

Oct. 16, 2000  (EP) .................................... 00402856
Feb. 7, 2001   (EP) .................................... 01102676

(51) Int. Cl.
| H04N 9/80 | (2006.01) |
| H04N 5/44 | (2011.01) |
| H04N 5/76 | (2006.01) |
| H04N 21/433 | (2011.01) |
| H04N 5/781 | (2006.01) |
| H04N 9/804 | (2006.01) |

(52) U.S. Cl.
CPC ................ H04N 5/4401 (2013.01); H04N 5/76 (2013.01); H04N 5/781 (2013.01); H04N 9/8042 (2013.01); H04N 21/4332 (2013.01)

(58) Field of Classification Search
USPC ......... 386/95, 46, 83, 98, 239, 247, 248, 343, 386/344, 360
See application file for complete search history.

(56) References Cited

U.S. PATENT DOCUMENTS

| 5,435,004 | A | 7/1995 | Cox et al. | |
| 6,009,234 | A * | 12/1999 | Taira et al. | 386/95 |
| 6,075,906 | A | 6/2000 | Fenwick et al. | |
| 6,160,501 | A * | 12/2000 | Tallam | 341/60 |
| 6,240,241 | B1 * | 5/2001 | Yuen | 386/95 |
| 6,321,237 | B1 | 11/2001 | Yamamoto et al. | |
| 6,453,119 | B1 * | 9/2002 | Maruyama et al. | 386/95 |
| 6,553,446 | B1 | 4/2003 | Miller | |
| 7,106,946 | B1 * | 9/2006 | Kato | 386/241 |

FOREIGN PATENT DOCUMENTS

| JP | 5-204725 | 8/1993 |
| JP | 8-69399 | 3/1996 |

(Continued)

*Primary Examiner* — Tat Chio
(74) *Attorney, Agent, or Firm* — Myers Wolin LLC (57) ABSTRACT

Storage device for stream data such as digital video and for non-stream data such as computer files, comprising a single file system which features a first type of storage unit for storing audio and/or video streams and a second type of storage unit for storing non-stream data, wherein the size of the first storage unit is a multiple of the size of the second storage unit, said device further comprising means for allocating a unit of the first type either for stream storage or to split a unit of the first type into a plurality of units of the second type, for storage of non-stream data. The invention also concerns a method for storing stream data or non-stream data. Applicable in digital television systems.

25 Claims, 8 Drawing Sheets

(56) References Cited

FOREIGN PATENT DOCUMENTS

| | | |
|---|---|---|
| JP | 8-241230 | 9/1996 |
| JP | 10-283230 | 10/1998 |
| WO | WO9004226 | 4/1990 |
| WO | WO9102308 | 2/1991 |
| WO | WO 99/15994 | 4/1999 |
| WO | 00/40019 | 7/2000 |
| WO | WO 00/40020 | 7/2000 |

* cited by examiner

Fig. 1

| Disk size in Gbytes | % used for Inf. data | Solution A: | | | Solution B: | | | Ratio A/B |
|---|---|---|---|---|---|---|---|---|
| | | Big block bitmap size | Small block bitmap size | Total bitmap size | Big block bitmap size | Small block bitmap size | Total bitmap size | |
| 8 | 25% | 8 KB | 512 KB | 520 KB | 256 KB | 128 KB | 384 KB | 1.35 |
| 8 | 50% | | | | | 256 KB | 512 KB | 1.02 |
| 8 | 100% | | | | | 512 KB | 768 KB | 0.68 |
| 32 | 6.25% | 32KB | 2048 KB | 2080 KB | 1024 KB | 128 KB | 1152 KB | 1.81 |
| 32 | 25% | | | | | 512 KB | 1536 KB | 1.35 |
| 32 | 50% | | | | | 1024 KB | 2048 KB | 1.02 |

Fig 2

MSB                                                                                     LSB

| L times mini bitmap size | 4 bytes | Run pointing the next mini bitmap table section | Section header |
| --- | --- | --- | --- |
| | 1 byte | Informative byte | |
| | 1 byte | Stuffing length in bytes | |
| | J bytes | Stuffing | |
| M times mini bitmap size | K bytes | Bitmap for the below section of mini bitmap table | Bitmap for bitmap zone |
| N times mini bitmap size | One time mini bitmap size | First Mini Bitmap | Zone for minibitmap tables |
| | ... etc ... | ... etc ... | |
| | One time mini bitmap size | Last Mini Bitmap | |

Fig. 5

| Total amount of informative data to store (in Gbytes) | 8 | 512 | 1024 | 1024 |
|---|---|---|---|---|
| Big Block Size (in Kbytes) | 128 | 128 | 512 | 512 |
| Small Block Size (in Kbytes) | 2 | 2 | 2 | 8 |
| Mini bitmap size (in bytes) | 8 | 8 | 32 | 8 |
| Amount of data pointed by a mini bitmap section (which size is one big logical block) (in Gbytes) | 2 | 2 | 8 | 32 |
| Total size (in big logical blocks) for the entire mini bitmap table | 4 | 256 | 128 | 32 |

Fig 6

| Bit 7 | Bit 6 | Bit 5 | Bit 4 | Bit 3 | Bit 2 | Bit 1 | Bit 0 |
|---|---|---|---|---|---|---|---|
| 1 : totally busy<br>0 : still free mini bitmap | Reserved | | | | | | |

Fig. 7

| Addr (hexa) | Size (byte) | field |
|---|---|---|
| 00h | 4 | File identifier |
| 04h | 2 | Mode |
| 06h | 2 | User Id (file owner) |
| 08h | 2 | Group Id (file owner group) |
| 0Ah | 2 | File link number |
| 0Ch | 4 | File creation date |
| 10h | 4 | Last modification date |
| 14h | 4 | Expiration date |
| 18h | 4 | File size in bytes |
| 1Ch | 24 | 6 run or zone addresses |
| 34h | 4 | Pointer of inode extension |
| 38h | 4 | Reserved |
| 3Ch | 4 | Pointer on another file (link file) |
| total | 64 | |

Fig. 8

```
MSB                                                              LSB
B31                          B23                                  B0
```
| File system (last byte) | identifier |
|---|---|

Fig. 9

| File type | Unused | | | | User | | | Group | | | All others | | |
|---|---|---|---|---|---|---|---|---|---|---|---|---|---|
| | | | | | R | W | X | R | W | X | R | W | X |

R : Read allowed, when set
W : Write allowed when set
X : execution allowed, when set

Fig. 10

| Addr Hexa | Size in bytes | Field |
|---|---|---|
| 00h | 4 | File Id |
| 04h | 2 | Mode (same as for inode) |
| 06h | 2 | Reserved |
| 08h | 48 | 12 run or zone address |
| 38h | 4 | Reserved |
| 3Ch | 4 | Next extension pointer |
| Total | 64 | |

Fig 11

| 64 bytes | 4 bytes | Run pointing the next inode bitmap table | header |
|---|---|---|---|
| | 1 byte | Informative byte | |
| | 59 bytes | Stuffing | |
| M times 64 bytes | K bytes | Bitmap for the below section of inode bitmap table | Bitmap table for inode extension |
| N times 64 bytes | 64 bytes | First Inode (or extension) of the section | Zone for inode and extensions |
| | ... etc ... | ... etc ... | |
| | 64 bytes | Last inode (or extension) of the section | |

Fig. 12

| bit 31 ..... bit 9 | bit 8 | bit 7 .... bit 0 |
|---|---|---|
| Big logical block address | Addressing mode | Small logical block sub-address |

Fig. 13

| bit 31 ..... bit 9 | bit 8 .... bit 0 |
|---|---|
| First big logical block address | Length (in big logical blocks) of the run |

Fig. 14

| File Id (4 bytes) | File Name (60 bytes) |
|---|---|

Fig. 16

| Addr.hexa | Size (bytes) | Field |
|---|---|---|
| 00h | 2 | File System Identifier (8 bits) |
| 02h | 2 | Reserved |
| 04h | 4 | Disk sector size in byte |
| 08h | 4 | First LBA available for this volume |
| 0Ch | 4 | Reserved |
| 10h | 4 | Last LBA available for this volume |
| 14h | 4 | Reserved |
| 18h | 4 | Big logical block size in byte |
| 1Ch | 4 | Small logical block size in byte |
| 20h | 4 | Mini bitmap size in byte |
| 24h | 4 | Number of big logical blocks in the partition |
| 28h | 4 | Lba of disk sector where the big logical block number one starts |
| 2Ch | 8 | Reserved |
| 34h | 4 | Super-map run address |
| 38h | 8 | Reserved |
| 40h | 4 | Run address of the first section of the mini bitmap table. |
| 44h | 4 | Run address of the second section of the mini bitmap table. |
| 48h | 4 | Run address of the third section of the mini bitmap table. |
| 4Ch | 4 | Run address of the fourth section of the mini bitmap table. |
| 50h | 4 | Run address of the fifth section of the mini bitmap table. |
| 54h | 4 | Run address of the sixth section of the mini bitmap table. |
| 58h | 8 | Reserved |
| 60h | 4 | Run address of the first section of the inode table. |
| 64h | 4 | Run address of the second section of the inode table. |
| 68h | 4 | Run address of the third section of the inode table. |
| 6Ch | 4 | Run address of the fourth section of the inode table. |
| 70h | 4 | Run address of the fifth section of the inode table. |
| 74h | 4 | Run address of the sixth section of the inode table. |
| 78h | 8 | Reserved |
| 80h | 4 | Run address of the first section of the inode extension table. |
| 84h | 4 | Run address of the second section of the inode extension table. |
| 88h | 4 | Run address of the third section of the inode extension table. |
| 8Ch | 4 | Run address of the fourth section of the inode extension table. |
| 90h | 4 | Run address of the fifth section of the inode extension table. |
| 94h | 4 | Run address of the sixth section of the inode extension table. |
| 98h | 360 | *Reserved* |
| Total | 512 | |

METHOD AND DEVICE FOR STORING STREAM DATA SUCH AS DIGITAL VIDEO AND NON-STREAM DATA

This application claims the benefit, under 35 U.S.C. § 365 of International Application PCT/EP01/11532, filed Oct. 5, 2001, which was published in accordance with PCT Article 21(2) on Apr. 25, 2002 in English and which claims the benefit of European patent application No. 00402856.9, filed Oct. 16, 2000 and European patent application No. 01102676.2, filed Feb. 7, 2001.

The invention concerns a method and device for the storage of stream data such as digital video and audio and also for the storage of files of smaller type.

Development of digital TV has lead to the idea to record digital TV data stream on a recording medium such as a hard disk. Digital TV data streams comprise digital audio and video data as well as traditional information data. The use of these two kinds of data is different. The differences can be summarised as follows: digital audio and video data require high bit rate data streams (with real time constraints) but with lower constraint on the bit error rate, while computer type information data require a very low bit error rate and generally do not impose real time constraints.

File systems are used to store and organize data on a hard disk. Known file systems are optimised for traditional information data constraints: in particular they use logical data blocks (basic unit for disk space allocation) which are rather small (of the order of magnitude of the disk sector size) in order to optimise the efficiency of disk space use.

For a digital TV data stream, such file systems may not offer satisfactory performances. The small size of the logical blocks may lead to file fragmentation. As a consequence, the disk head may often move from one logical block to another and may therefore be proportionally less used for direct read operation. This leads to a decrease of the global available bandwidth. In other words, the file system decreases the performances of the hard disk itself.

This drawback can be avoided if the file system uses bigger logical blocks. This avoids too many disk head moves, comprising the case when the file is fragmented. The traditional argument against the use of big logical blocks is the poor efficiency of the disk space use. This is true for small size files but not for the large digital TV files.

A double file system has been proposed for instance in the PCT patent application WO 0040020 in the name of THOMSON multimedia, filed on Dec. $22^{nd}$ 1999 with a priority date of Dec. $23^{rd}$ 1998. This double file system comprises a part dedicated to small size files, and a part dedicated to the recording of audio/video streams.

The system described in the application above implements a double file system with two separate directory trees. Once the double file system is formatted the space ratio on the disk between informative data-space and digital TV data-space is fixed. To a certain extent, the user has two file systems or two disks, one for classical data storage, one for digital TV data storage.

The allocation method should take into account this possibility in order to ensure a good efficiency of the disk space use. A method to this purpose is proposed.

The object of the invention is a storage device for stream data and non-stream data characterised in that it comprises a file system which features a first type of storage unit for storing audio and/or video streams and a second type of storage unit for storing non-stream data, wherein the size of the first storage unit is a multiple of the size of the second storage unit, said device further comprising means for allocating a unit of the first type either for stream storage or to split a unit of the first type into a plurality of units of the second type, for storage of non-stream data In one embodiment, there is only one directory tree for both types of storage units and both types of files.

The storage device can store informative data (non-stream data) or audio/video data (stream data) in an efficient manner, avoiding a fragmentation of the storage, without defining a fixed area for informative data and a fixed area for audio/video data.

Advantageously, a unit of the first type split into a plurality of units of the second type can be, upon availability of all these units of the second type and according to the type of data to be stored, no more split into a plurality of units of a second type.

The storage device is then in accordance with the type of data to be stored and the storage device occupation is optimised. This avoids the fragmentation of the disk when there are only big size files to store. These ones are stored in a big block, whereas when there are a lot of small size files to store, big size blocks are split in small size blocks as long as there is a need.

Preferably, at least one first data structure indicates at least for each first type unit whether this unit is free or not, and whether this unit is divided in a plurality of second type storage units or not.

Thanks to this first data structure, information is given on the big size blocks and especially on the availability and on the structure of this data unit. Then it is easy to know whether this big size block can accept new data or not and which type of data it can accept. It means that if this block is split in small size blocks, whether one of the block is free, and if this block is not split, whether this block is already occupied or not.

According to another embodiment, a second data structure gives the availability of each storage unit of the second type unit included in the storage unit of the first type, the second data structure address being indicated in the first data structure.

Preferentially, the size of the second data structures and the number of said second data structures depend on the total amount of non-stream data the storage device has to store, the number of second data structures changing upon the allocation of a first type of storage unit to a second type of storage unit.

This avoids a useless fragmentation of the disk when there are only audio/video data files to store. Moreover, when a big size block has been split into small size blocks for storing informative data, if all the small size blocks are available, the big size block is then again available for audio/video data if needed. It means that the splitting of a big size block into small size blocks is not definitive.

According to a preferred embodiment, the second data structures are stored in at least one section of at least one storage unit of a first type, and if more than one section is needed, each of the sections gives the address of the next section.

In that manner, all the second data structures are grouped, this makes the management of the storage device easier.

Preferentially, a third data structure is associated with each section storing the second data structures, the third data structure indicating the availability of the different second data structures of the section.

This third data structure enables to know quickly which second data structure is available when there is informative data to store.

A first indicator is associated with each section storing the second data structures, the indicator indicating if at least one second type storage unit associated with the second data structures of the section, is available This avoids looking at each third data structure when there is a need for a second type storage unit, especially when no second data structure is available.

In a advantageous manner, one new section storing the second data structures is allocated when the indicators associated with the sections already allocated indicate that no storage unit of a second type is available and upon request of additional storage units for non stream data.

According to a first embodiment, a first file information structure is associated with each file stored, the file information structure indicating at least a file identifier, a file type, at least a field indicating the at least one location of the file on the storage means and if this field cannot contain the whole location of the file, a pointer on a second file information structure.

This makes the storage device management easier and allows the retrieval of the files. Thanks to this characteristic, the file size is not limited and constrained to the size of the field.

In one embodiment, the first file information structures are stored in at least one section, and if more than one section is needed, each of the section gives the address of a next section.

This makes easier the management of the storage and avoids the address jumping.

The second file information structures are stored in at least one section, and if more than one section is needed, each of the section gives the address of a next section.

Preferentially, a third file information structure is associated with each section storing the first file information structures, the third file information structure indicating the availability of the different first file information structures of the section.

Preferentially, a fourth file information structure is associated with each section storing the second file information structures, the fourth file information structure indicating the availability of the different second file information structures of the section.

In one embodiment, one second indicator is associated with each section storing the first file information structures, the second indicator indicating if at least one of the first file information structure is available.

Preferentially, one third indicator is associated with each section storing the second file information structures, the third indicator indicating if at least one of the second file information structures is available.

In one embodiment, one new section storing the first information structures is allocated when the second indicators associated with the sections already allocated indicate that no first file information structure is available and upon storage of a new file.

Preferably, one new section storing the second file information structures is allocated when the third indicators associated with the sections already allocated indicate that no second file information structure is available and upon storage of a new file, the location of which cannot be contained in the field of its corresponding first file information structure.

In one embodiment, the at least one field indicating the at least one location of the file on the storage mean indicates when the file contains audio and/or video streams, the address of the first storage unit and the number of first storage units necessary to store the file and, when the file contains non-stream data, the address of the first storage unit and the address of the second type storage unit inside the first storage unit.

In a preferred embodiment, it comprises one global data structure giving at least the addresses of the different sections, the size of the first storage units and the size of the second storage units.

Another object of the invention is a method for recording stream data and non-stream data on a storage medium, said method comprising the steps of:

Providing first and second type storage units on the storage medium where the size of the first type unit is at least one magnitude greater than that of the second type unit, Processing stream data or non-stream data blocks to prepare storage according to corresponding storage units;

If stream data is to be recorded allocating a first type unit on the disk for storage of said stream data;

If non-stream data is to be recorded, splitting a unit of the first type into a plurality of units of the second type and allocating at least part of said second type units for storage.

The invention concerns also a digital TV decoder, or set-top box, including a storage device as described above.

Other characteristics and advantages of the invention will appear through the description of a non-limiting embodiment of the invention, which will be illustrated, with the help of the enclosed drawings among which:

FIG. 15 represent the bytes 0 to 511 of the super block;

A definition of terms frequently used in this document is given below:

Logical block: the logical block is the elementary data unit, which the file system manages. In other words, it is the elementary unit which is allocated (or disallocated) to the data-space of a file. The logical block is a notion purely attached to the file system. It is different from the concept of disk sector (although a logical block is constituted of one or several disk sectors). In other documents, one may find the term "cluster" instead of logical block to designate the elementary file system data unit (as a cluster of disk sectors). In other documents, the word logical block may also be used to designate physical addressable entities on the disk.

Digital TV data: The data stream for digital TV has particular characteristics: high amount of data and real-time delivery (there is a notion of bit-rate attached to the stream). Any file the data of which has to be written (or read) with such characteristics is considered as digital TV data. For instance a file containing an MPEG Transport Stream is considered as Digital TV data.

Informative data: by opposition to the digital TV data, informative data represent a moderate amount of data and has no particular bit-rate attached to it. In case of a low bit-rate attached to a file, but low enough that it is respected anyway by the file system, one can consider that no bit-rate is attached to the file. Any file the data of which has these characteristics can be considered as informative data (a word file is considered as informative data). As a consequence of these two definitions (digital TV data and Informative data), the boundary between the two types of data is not absolute. An audio file, for instance may be considered as Informative data (if its bit-rate is sufficiently low) or Digital TV data (in the other case).

Volume: This is the entire addressable space of the disk organised according to this document.

Partition: This is a section of the volume. In this document there is only one partition in the volume.

Inode: This is a basic structure for storing all the relevant information for a file (file ID, attributes, and pointers on data space).

Extension: The extension of an inode. Inodes are supposed to contain the whole description of the file data space. If not sufficient, they point to an extension (which, itself, may point to another extension if necessary, constituting a chained list).

Run: several consecutive logical blocks. Its data space descriptor indicates the address of the first logical block of the run and the length (in number of logical blocks) of the run. Run is also used instead of "run descriptor", "run length" and "run address" in the following description.

Section: a section is comprised of at least one storage unit of a first type.

Figure 1:
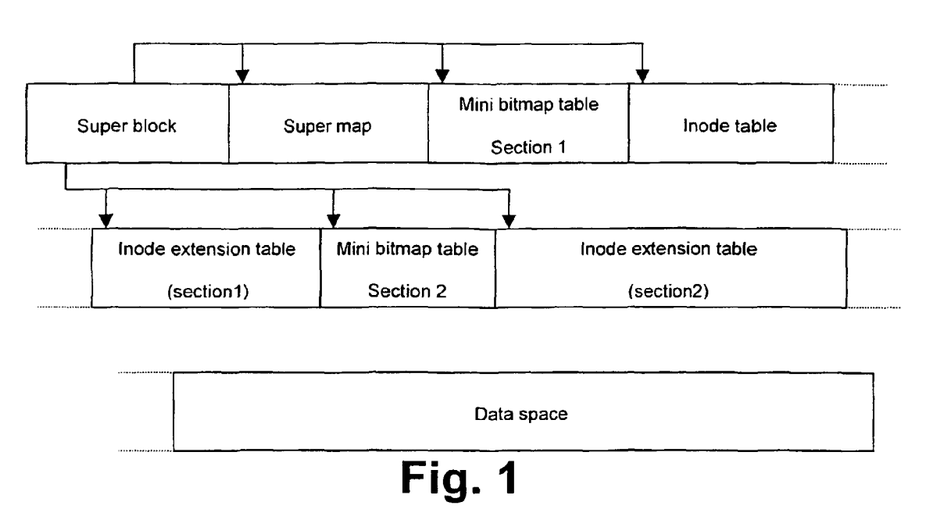
FIG. 1 is a general overview of the proposed file system.

FIG. 1 gives an overview of the file system.

The part of the disk devoted to user data is divided into big size logical blocks and the big size logical blocks may be divided into small size logical blocks. The other part of the disk is devoted to the file system information storage and is supposed to have its own allocation mechanism.

The disk is divided into disk sectors. Disk sector 0 is expected to be reserved (possibly some additional ones, contiguous to sector 0 are also reserved). Disk space is available for the file system from disk sector N to disk sector LBA_Max. In a first step, the disk is divided into big logical blocks. One big logical block contains M disk sectors and big logical block number one is supposed to start with disk sector M (or at LBA M). This implies that N<M which is expected to be always true (N is in the order of the unit while M in the order of several hundreds). Disk sectors from N to M−1 make up the super block.

The super block contains basic information pointing to the basic structures (described above) of the file system.

The super block contains all the file system basic information. It is supposed to be located in the first big logical block on the disk. The first logical block is logical block number 0 and that it starts at LBA 0. If LBA 0 is reserved for disk use, the super block starts effectively at LBA 1.

The Super-block points to the super map, on the mini-bitmap table, the inode table and the inode extension table. For each big block, thanks to the super-map and the mini bitmap table, it is possible to know which are the free mini blocks. Besides, the root directory is stored in inode number one. These represent all the necessary elements for starting to navigate inside the system.

Beside various information (the detailed list of which is given later in this document) the Super-block contains the list of the mini bitmap sections (a run address list), the list of inode table sections and the list of extension table sections. It is necessary to reserve sufficient space for each list. All these elements are detailed later in this document.

The disk data-space is supposed to be available for informative as well as digital TV streamed data. This means that any disk fraction free of data is available for allocation to one of the two data types.

The total amount of informative data that may be recorded on the disk represents only a fraction of the whole disk storage capacity. The invention makes also possible to dynamically change this size without reformatting the whole disk.

The data-space of the disk is divided into big size logical blocks. The size of a big size logical block is calculated according to the following criteria:

Same order of magnitude as the disk cache buffers,
Granularity for video data not higher than a few seconds.

Preferably, the big logical block size (as well as the small size logical block one) is a power of two, between 128 Kbytes to 1 Mbytes for a typical disk drive.

Any big size logical block may be allocated to the storage of one or the other type of data. Once it has been allocated to the storage of one data type (informative or digital TV), it is entirely devoted to this data type. If the big logical block is free again, it can be reallocated to any kind of data.

For digital TV, one big size logical block represents the elementary storage unit. One logical block contains one segment of the data of the same video file.

For informative data, in a preferred embodiment, the big size logical block is divided into small logical blocks. The size of small logical blocks is in the order of magnitude of traditional sizes of file system logical blocks, i.e. between 512 bytes and 8 Kbytes. Each small size logical block is independent and may be affected independently of the others to any informative data file. Consequently a big size logical block devoted to informative data storage may contain data from several files.

As an example, big block size is fixed to 128 Kbytes and small block size to 2 kbytes. Other figures (in the same order of magnitude) may be possible.

Each logical block should be addressable. For big size logical blocks, each block is numbered depending on its position on the disk. The logical address of the block is derived from the LBA address of the disk sector where the block starts.

Small size logical blocks are considered as sub blocks of big size logical blocks. Their address is therefore a sub-address. For each small size logical block, the address of the big size block which contains it must be indicated as well as inside the big size block, the relative sub-address of the small size logical block. The sub-addresses are the order number of the small size logical blocks inside the big size logical block.

For example, for a 32 gigabyte disk, there will be 256 Kb big size logical blocks (of 128 Kbytes). An 18-bit address is necessary for addressing big size logical blocks. A big size logical block of 128 Kbytes contains 64 small size blocks of 2 Kbytes. A 6-bit sub-address is necessary for the small size block sub-addressing.

The purpose of a bitmap is to indicate for each logical block if it is free or busy. A single bit per logical block is sufficient for this purpose.

A bitmap is necessary for the big size logical blocks, and another one is necessary for the small size logical blocks. For big size logical blocks, there is no particular problem to map bits to blocks as far as big blocks cover all the disk data-space (bits in the bitmap are in the same order as blocks on the disk).

This is not the case for small size logical blocks. The allocation of big blocks to the storage of informative or digital TV data is dynamic. The same big block may alternately be allocated to the storage of informative data (containing small logical blocks) and then to digital TV data (no small size logical blocks). The bit to block mapping is evolving permanently.

This dynamic allocation prohibits the use of a traditional bitmap.

In a first embodiment, the whole disk is devoted to informative data storage. There is a second bitmap describing the whole disk data-space but divided into small logical blocks. This bitmap is larger than the big size logical blocks bitmap in the proportions of the size ratio between big and small size logical blocks. With our example figures, the second bitmap (which describes a second time the same disk space) is 64 times bigger.

In a second embodiment, one associate with each big size block a pointer to a sub-bitmap table only describing the big size block itself. All sub-bitmaps may be regrouped in a large table (the elements of which are a sub-bitmap). When a big size block is allocated to informative data storage, one element of the table of the sub-bitmaps is allocated to it. The address of this element should be associated with the address of the big size logical block.

A simple solution to this problem is to store this address in the big size block bitmap. The information is not a binary information any longer. A bigger field should replace the bit. It is proposed to use a four-byte field for each big size logical block.

The bitmap for the big size blocks is now a table of 4 byte fields instead of one single bit. It has become 32 times bigger and it is not a bitmap anymore but four-byte-map or a supermap. It is called super map, or first data structure, in this document.

In addition to indicating the address of the sub-bitmap, the 4-byte field also indicates if the big size block is free, or devoted to digital TV storage. It may also indicate if it is full or not.

Figure 2:
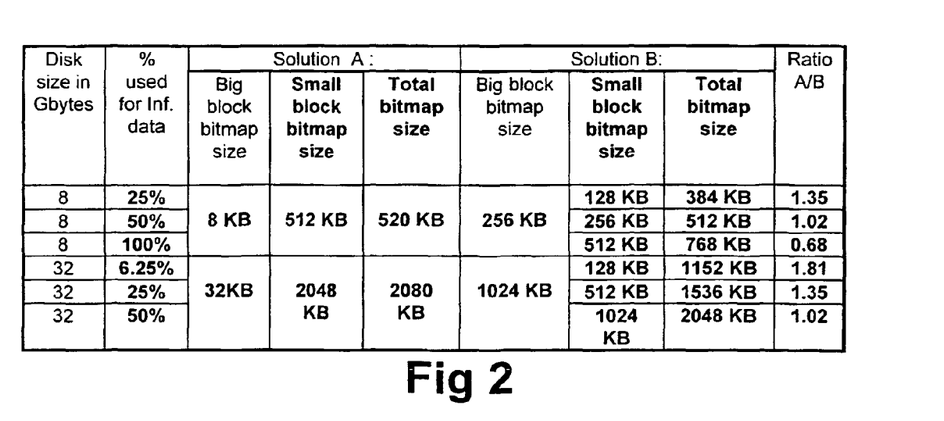
FIG. 2 is a comparison table between two embodiments of the invention.

To compare the two embodiments, some examples are summarised on FIG. 2 with the same figures for big logical block size (128 Kbytes) and small logical block size (2 Kbytes).

FIG. 2 gives the disk space required for the two solutions, as a function of disk capacity.

The second embodiment is consuming less disk space except when more than half of the disk capacity is devoted to informative data storage. Anyway the disk space occupied by bitmaps represent a small amount of the total disk space (ratio total bitmap size/disk size: between 1/132000 and 1/10000 in the figures above).

As far as it is expected that a multimedia file system will be implemented over a large capacity disk (at least several tens of Gbytes) and that only part of the storage capacity is devoted to informative data, the second embodiment will be considered in the remaining parts of the description.

Figure 3:
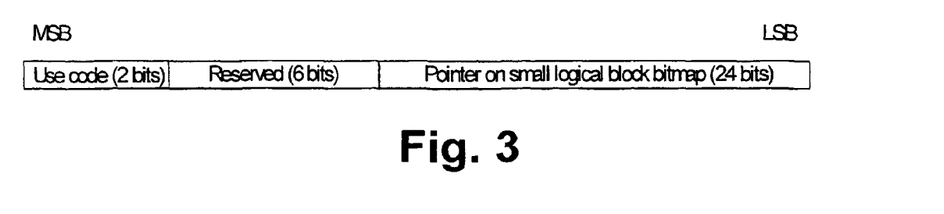
FIG. 3 is a diagram of the super map.

FIG. 3 gives the structure of the super map.

The bitmap for the data-space contains a non-binary information. For each big size block three states are possible: free, busy with digital TV data, busy with informative data. In the last case, the big size block may not be entirely occupied. A table associated with a big size block indicating which sub logical blocks inside the big size logical block are free or not will now be discussed.

The 32-bit field devoted to each big logical block contains a pointer on the attached small logical block bitmap table. 24 bits are sufficient for this pointer (it allows to points 16 M bitmap, each representing 128 Kbytes of data.; in other words 2048 Gbytes of informative data. 8 bits are left, among which 6 are reserved for future use and 2 are used for coding the state of the big logical block with the following code:

00: free big logical block,
01: logical block reserved for digital TV data storage, necessarily entirely busy, may also contain informative data for the file system)
10: logical block reserved for informative data storage, contains free small logical blocks,
11: logical block reserved for informative data storage, entirely busy.

Note that when the 'Use' code indicates that the logical block is reserved for the storage of digital TV data, the 24-bit pointer field content has no meaning.

Figure 4:
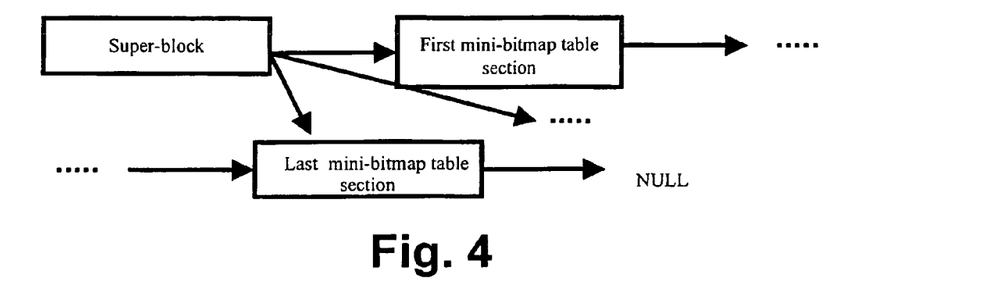
FIG. 4 is a diagram illustrating the addressing principle of a mini bitmap table through the super block.

As shown on FIG. 4, it is proposed to associate with each big logical block one mini bitmap (also called second data structure) for the small logical blocks it contains. This association is dynamic. This means that only big logical blocks allocated to the storage of informative data pointing to a mini bitmap. If a big logical block (previously allocated to the storage of informative data) is disallocated, the mini bitmap, which is associated with it, is free again and available for any new big logical block allocated to informative data storage.

The size of the mini bitmap table depends on the sizes of the big and small logical blocks. With 128 Kbytes for big logical blocks and 2 Kbytes for small logical blocks, the mini bitmap size is 64 bits or 8 bytes.

Figure 5:
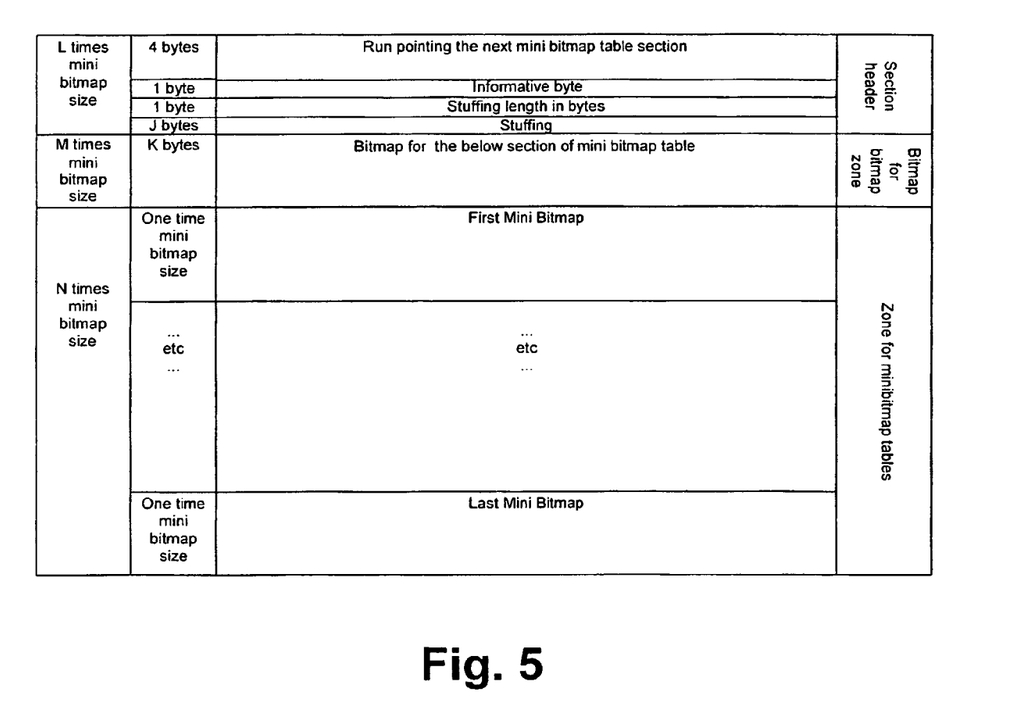
FIG. 5 is an example of the format of a mini bitmap section.

As shown on FIG. 5, it is proposed to group in the same table all the mini bitmaps. This table is called mini bitmap table. The 24-bit pointer of the super map, on FIG. 3, is then the order number of the mini bitmap in the mini bitmap table.

The size of the mini bitmap table depends on the total amount of informative data the file system is able to store. This amount is not fixed once the disk is formatted. Consequently the size of the mini bitmap table may evolve. In particular it may increase when new disk space is devoted to the mini bitmap table. In addition to this, since the mini bitmaps can be dynamically allocated or re-allocated to one or the other big logical block, it should be indicated which bitmap in the mini bitmap table is free or not for allocation. In other word a bitmap of the mini bitmap table is necessary, it is called third data structure.

It is proposed to allocate to the mini bitmap table an integer number of big logical blocks. Since data space devoted to informative data may increase, allocation of big logical blocks devoted to the mini bitmap table may be performed in several steps, not in contiguous big logical blocks. However, it is proposed at each allocation step, to allocate to the mini bitmap table a data space made of contiguous big logical blocks. It is proposed to call it section. The mini bitmap table is then made of one or several sections. A section is made of one or several big logical blocks. Each section also contains its own bitmap, regarding the fraction of the mini bitmap table included in the section. It points also on the next section of the mini bitmap table.

Each section is divided into elements the size of which corresponds to the mini bitmap size (given in bits by dividing the big logical block size by the small logical block size). The first elements are devoted to the storage of the bitmap of the section and the pointer to the next section (plus additional information), the other ones store mini bitmaps.

Element (or mini bitmap) size and addresses (run) corresponding to each section have to be stored in the super block.

Figure 6:
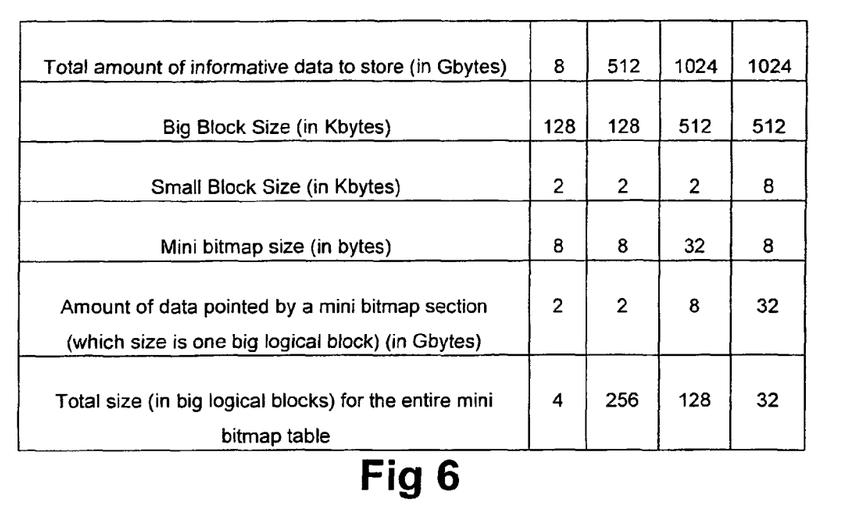
FIG. 6 gives some examples of block sizes and table sizes of the file system.

FIG. 6 indicates figures for some bitmap parameters.

The sections of the mini bitmap table make a chained list since each section is supposed to point on the next one. But for quicker recovery of the whole table, it is proposed to store the run address of each section in the super block.

Figure 7:
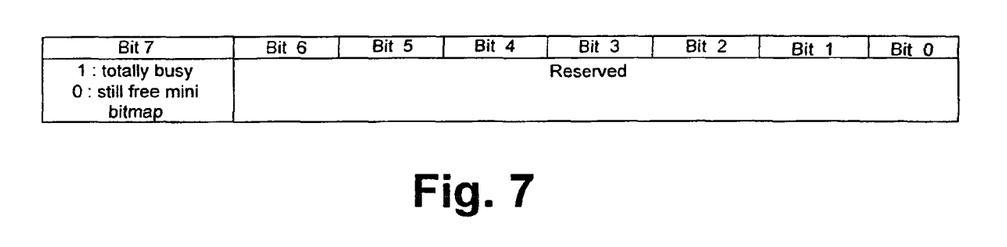
FIG. 7 is a diagram of the format of a byte containing general information regarding a mini bitmap table section.

FIG. 7 gives a possible format for the informative byte. The informative byte contains general information on the mini bitmap table section such as whether mini bitmap tables are free for allocation or section is entirely allocated.

Figure 8:
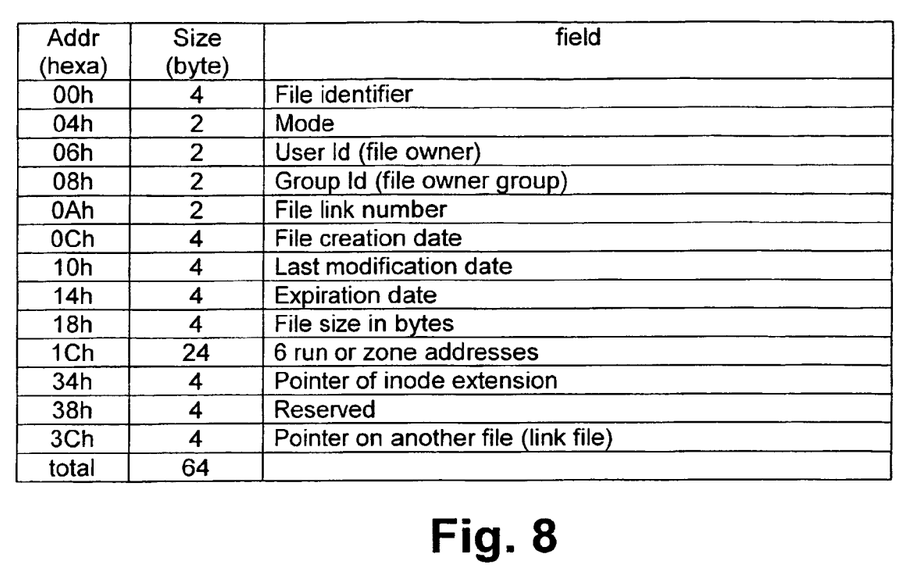
FIG. 8 is a table giving the format of an inode.

According to the present embodiment, an inode, also called first file information structure, has the format illustrated by FIG. 8.

One important point for the inode format definition is the method used to point the different data-space of the disk used to store the file data.

The inode is the entry point to a file. It contains the file id, pointers on the file data space and additional information. The inode may be extended (inode extension, also called second file information structure) if necessary to store additional data space pointers. Inodes and extensions are stored in an mode and Extension table.

It is proposed to allocate to each inode a fixed size of 64 bytes. 64 is chosen as a power of two and corresponds to the amount of data basically required for an inode (32 bytes is too small and 128 too big, according to the present embodiment—of course, figures as this one are given here only as an example and could differ in an other environment). The inode shall contain the file id, pointers on the data space of the file and other information detailed on FIG. 5. It shall not contain the name of the file. The name of the file is contained in the data space of the parent directory.

Figure 9:
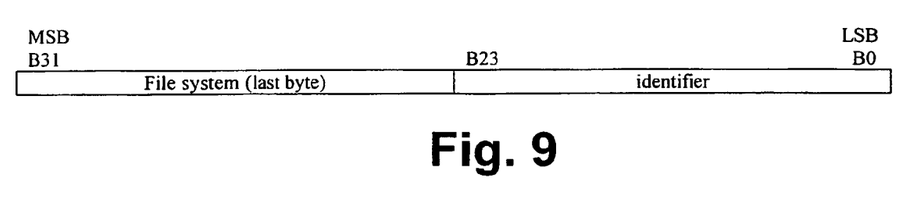
FIG. 9 is a diagram of the structure of a file identifier field in the inode.

Each of the inode fields are detailed here below:

File Identifier: it is a unique number identifying the file. The first byte is the least significant byte of the File System Identifier. The three last bytes are the unique number representing the file. Note that the file name is not contained in the Inode, but in the parent directory file (File ID and File Name are associated). FIG. 9 is an illustration of the file identifier structure.

Figure 10:
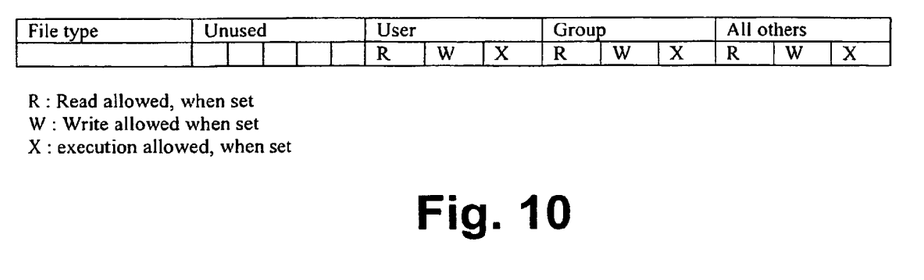
FIG. 10 is a diagram of the structure of a file mode field in the inode.

Mode: Bits 15 (MSB) and 14 of this field indicates the type of the file, it means whether the file is a directory (11) or a link file (empty file pointing on another file—10) an informative data file (01) or a digital TV file (00). The bits 13 to 9 are not used (value=0), and bits 8 to 0 are used as protection bits indicating whether user, group and others have read, write and execution rights on the file (UNIX like). The structure is indicated by FIG. 10.

The mode field contains the following items:

User Id (file owner): Unique number identifying the file user (or file owner in other words).

Group Id (file owner): Unique number identifying the group of the file user.

File link number: Number of link files pointing on this inode. If value is 0, inode is considered as free (the file is not referenced in any directory) and the corresponding data space can be freed. If the value is 1, the file is only pointed by itself (this inode). If equal or greater than 2, the file is pointed by other link files (other inodes pointing on this inode).

Last modification dates: self-explanatory.

Expiration date: self-explanatory.

File size in bytes: self-explanatory.

Zone or Run address: it is a four-byte field indicating a zone address if the file is an informative data file and a run address if the file is a video data file. This field indicates the location of the file on the storage device.

Pointer to an inode extension: the 6 zone or run address fields of the inode may not be sufficient to store the entire data space of the file. The inode extension contains additional zone or run addresses. If not sufficient, it points on another extension. The extension format is described here below.

Pointer on another file (link file): it contains the file id of the file to which this inode (link file) has a link.

Figure 11:
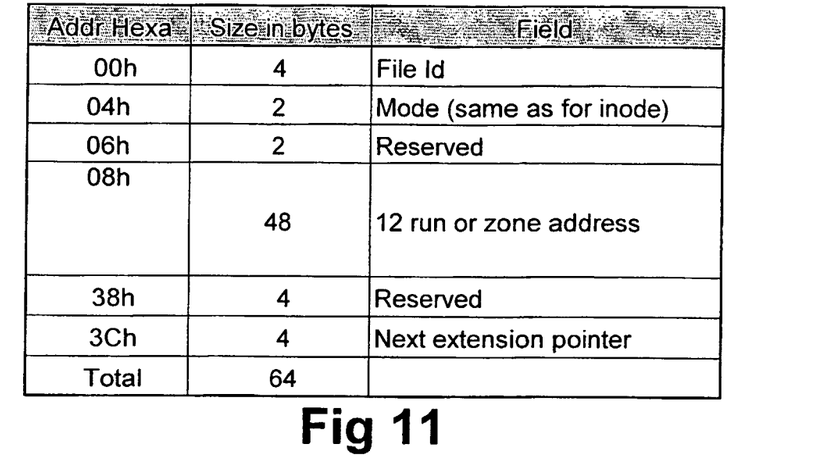
FIG. 11 is an example of the inode extension format.

FIG. 11 gives a description of the extension structure. An extension is a structure of 64 bytes, which contains either up to 12 runs or zone addresses. It may point on another extension.

Inodes are stored in a table called inode table. According to the present embodiment, an inode or extension table section has the format of FIG. 12.

Figure 12:
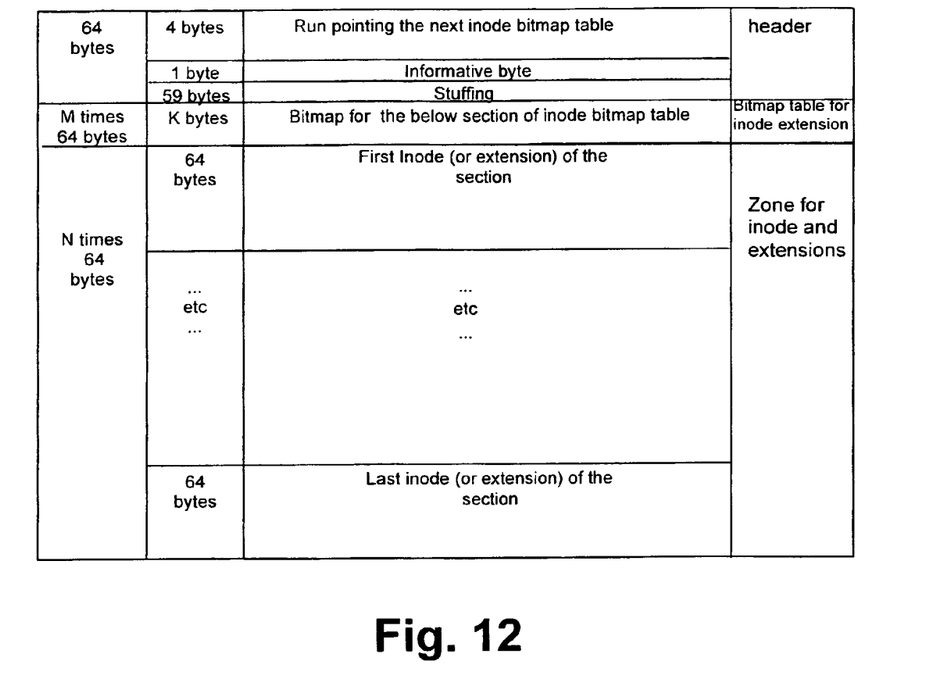
FIG. 12 is a table giving the structure of an inode or extension table section.

The format of this table is equivalent to the format of the mini bitmap table. It is made of an entire number of big blocks, not necessarily all consecutive, but grouped in sections of consecutive logical blocks. Each section starts with its own bitmap (indicating if the inodes and extensions contained in it are free or busy). The run corresponding to each section has to be stored in the super block.

The same can be said for extensions and the extension table.

The inode bitmap is also called third file information structure and the bitmap of the extension is called fourth file information structure.

To address a specific inode in the inode table, an inode pointer is used.

The inode pointer is simply the order number of the inode in the inode table. Note that the inode pointer and the 24 less significant bits of the file id correspond. Inode pointers are then coded on 24 bits. The 8 most significant bits are reserved and correspond to the file system id in the file id.

The same can be said for extensions except that extension pointers are coded on 32 bytes.

The informative byte contains general information on the mini bitmap table section as if mini bitmap tables are free for allocation or section is entirely allocated. The same format as for the mini bitmap table is proposed. The format of the informative byte is on FIG. 7.

Figure 13:
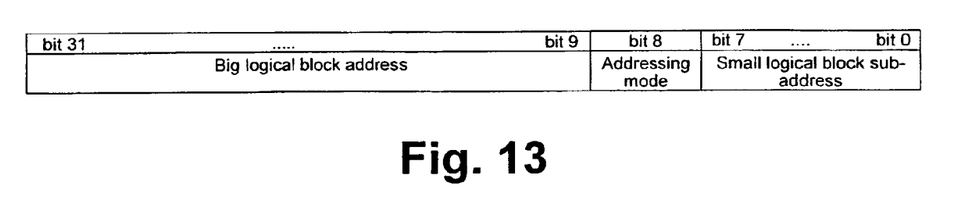
FIG. 13 is a diagram of a zone address format.
Figure 14:
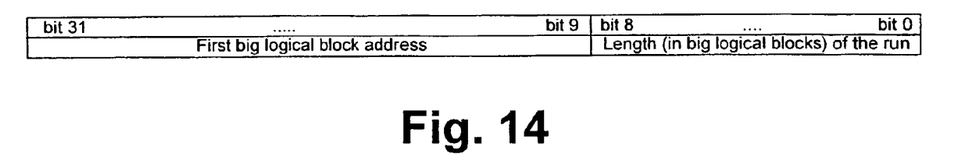
FIG. 14 is a diagram of a run address format.

The run or zone address is a four-byte field. It is used in the inode (or extension) to point on the data space allocated to the file.

The use shall be different for digital TV data and for informative data, as far as, on one hand, big logical blocks are pointed and, on the other hand, small ones.

For digital TV data, the concept of run is appropriate because of the continuous and regular arrival of a big amount of data. A run is a contiguous number of big logical blocks; it is described by giving the address of the first logical block of the run and the number of logical blocks in the run. The most significant bits of the four-byte field are devoted to the address of the first logical block, and the less significant bits to the number of logical block in the run. The number of bits devoted to each part is discussed further.

For informative data, the four-byte field is a zone address. A zone is a small logical block. A small logical block is included in a big logical block. Consequently the zone address is made of two parts: the big logical block address and the small logical block sub-address (i.e. its address inside the big logical block). It seems reasonable to expect small logical blocks to represent at least 2 Kbytes and big logical blocks less than 1 Mbytes (represents 4 seconds of a 2 Mb/s of video signal). Consequently 9 bits for the sub-addressing is sufficient.

Note that it imposes that the maximum number of small logical blocks inside a big logical block is 256 (case for respective sizes of 2 Kbytes and 512 Kbytes). In case of small logical blocks of less than 2 Kbytes big logical blocks shall be less than 512 Kbytes (128 Kbytes for 512 bytes small blocks) and vice versa (at least 4 Kbytes for 1 Mbytes big blocks). All these figures are self-consistent and reasonable. They justify the choice of 8 bits for small blocks sub-addressing.

This implies that 24 bits are left for big logical block addressing. This represents an amount of 16 millions of big logical blocks. If big logical block size is 128 Kbytes, it represents 2 Terabytes or 8 for 512 Kbytes blocks.

This shows that 24 bits for big logical block addressing is sufficient. This is also true for 23. This will spare one bit, which could be reserved for a special use as detailed below.

According to the present embodiment, the zone-addressing format is such as illustrated by FIG. 13.

Big logical block address: it is the order number of the big logical block on the disk.

Addressing mode: indicates how to read the next field. If 0 (single zone addressing mode), it indicates the order number of the small logical block inside the big logical block. If 1 (multi zone addressing mode), it indicates the order number (in the big logical block) of the first small logical block addressed by the pointer, considering that all the small logical blocks until the end of the big logical blocks are also addressed by this pointer. The purpose of the multi-zone addressing is to spare inode data space and to limit file fragmentation.

Small logical block sub-address: order number inside the big logical block.

The run addressing format according to the present embodiment is that of FIG. 14.

In most of the cases, the necessary data space for the mini-bitmap, inode and extension tables are reserved once, when formatting the disk. Sometimes additional data space may be required during system life. Additional sections are then added in the tables and additional runs in the lists. In most of the cases, only few sections are expected to be required for each table. However one cannot exclude worst cases, for which only the calculation here below are significant.

For the mini bitmap table section list, one can make the following hypothesis: it is requested to store 1024 Gbytes in small blocks of 2 Kbytes (for such an amount of data, a smaller size does not seem reasonable). This represents a mini bitmap table of 64 Mbytes. In the worst case, this table is exclusively made of sections of one big logical block, representing (case the big logical block size is 128 Kbytes) 512 runs. 2 Kbytes shall be reserved for storing the list. (note that as far as one run can contain up to 512 big logical block, this list could be made of one single run).

The file number (file identifier) is a 24-bit field (24 lower bytes of file identifier field of the inode on FIG. 9). Maximum size for inode table is 16 millions of inode or 1 Gbytes (one inode is 64 bytes). These represent 32768 big blocks of 128 Kbytes, so 32768 runs in the worst case. It shall be reserved 32 Kbytes for the inode table section list.

The same calculation for extension leads to 8 Mbytes (256 times 32 Kbytes as far as addressing is on 32 bits instead of 24 bits) which is not possible. A 64 Kbytes data space for the extension table section list offer however good possibilities (up to 32 millions of extension in the worst case for 128 Kbytes big blocks). Besides it is compatible with a 128 Kbytes big block size (the Super-block is supposed to correspond to one big logical block). Let's say that once reserved the first 512 bytes of the Super-block for general information, the next 2 Kbytes for the section list of the mini bitmap table, the next 32 Kbytes for the inode table section list, the end of the Super-block is devoted to the storage of the extension table.

As mentioned earlier these extension possibilities are not expected to be used very often. When formatting the disk, the required space for each of these tables is reserved in one run. Additional runs may be occasionally added. One could then propose to reserve in the 512 first bytes of the super block some space to store the first 6 runs of each table. Consequently, in most of the cases, the entire tables are stored at the beginning of the super-block. For exceptional cases the extension possibilities still exist It is proposed the following format for the super block:
bytes 0 to 511 (00 h to 1 FFh) are described on FIG. 15,
bytes 512 to 2559 (200 h to 9 FFh) reserved for the run of 7th and following sections of mini bitmap table extensions
bytes 2560 to 35327 (A00h to 89 FFh) reserved for the run of 7th and following sections of inode table extensions
bytes 35328 to the end of the first big logical block reserved for the run of 7th and following sections of inode extension table extensions.

Figure 16:
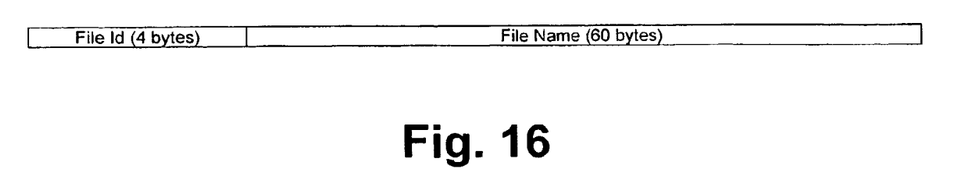
FIG. 16 is a diagram of the directory data space structure.

For the first 512 bytes, the organisation is as given in FIG. 15:

FIG. 16 represents the directory data space.

The directory data space contains the list of the files contained in the directory. The list contains for each file the file Id and the directory name. The list may contain additional information as for instance the file name. It is also possible to store this list directly in the inode (not stored in the file data-space, which then is null). It is proposed to reserve 60 bytes for each file name so that a 64-byte field (4 for file Id and 60 bytes for file name) characterises each file.

The directory data space is then structured as being a succession of 64 byte fields.

According to the preferred embodiment, the storage device is a hard disk included in a television decoder, according to the DVB (digital Video Broadcast) standard.

Figure 17:
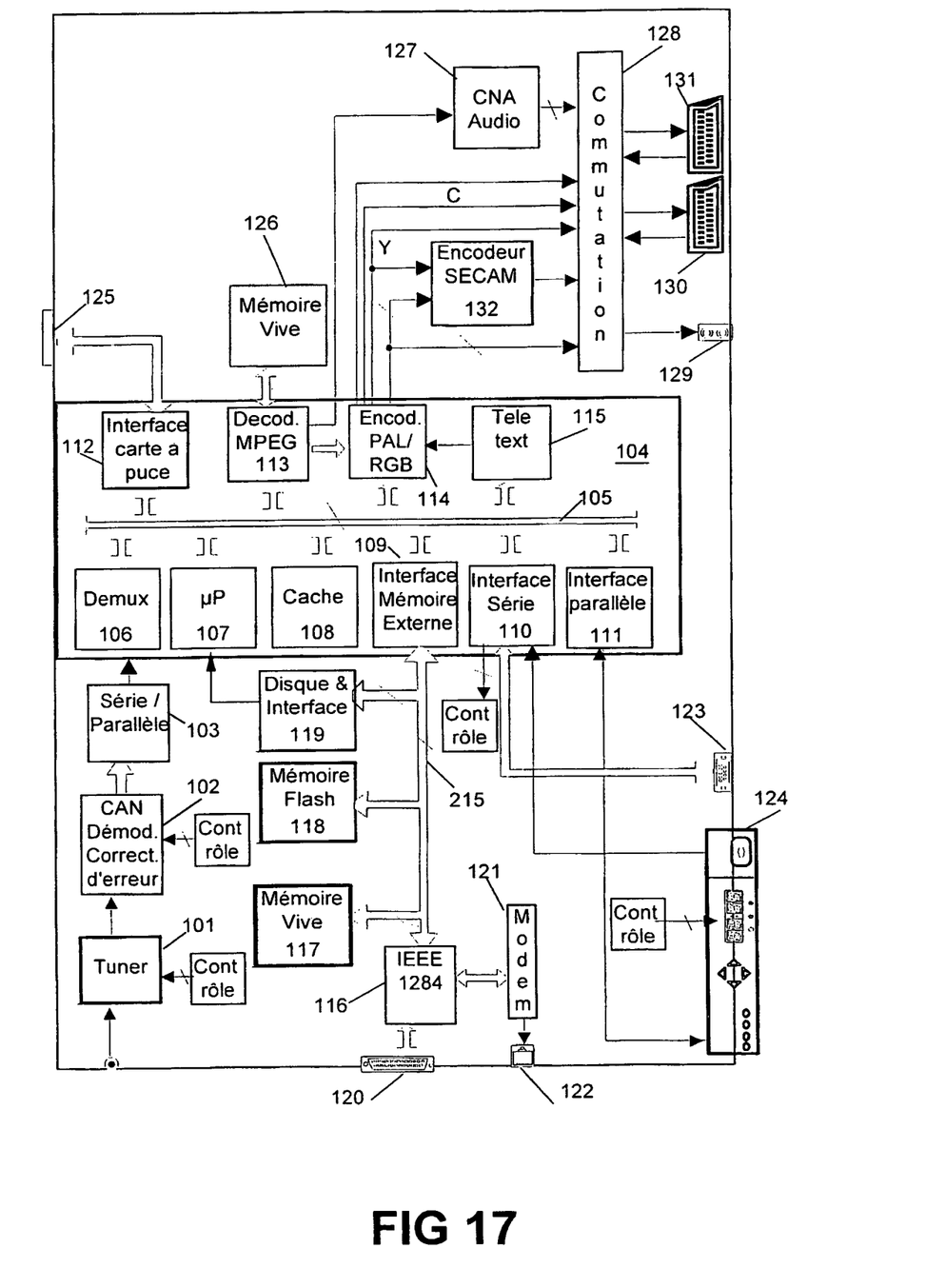
FIG. 17 is a diagram of a television decoder including a storage device.

FIG. 17 is a bloc diagram of a decoder. The decoder includes a tuner 101 connected to a demodulation and error correction circuit 102 which includes also an analog to digital converter in order to digitalize the signals coming from the tuner. The corrected and demodulated data are serialised by a converter 103, connected to a serial input of a demultiplexing and decoding circuit 104. Circuit 104 includes a DVB demultiplexer 106, a microprocessor 107, a cache memory 108, an external interface memory 109, a serail communication interface 110, a parallel input/output interface 111, a smart card interface 112, a video and audio MPEG decoder 113, a PAL and RGB encoder 114 and a character generator 115. The external memory interface 109 is connected to a 16-bits parallel bus, to which are also connected a parallel interface 116, for example a IEEE 1284 interface, a memory 117, a flash memory 118 and a hard disk drive 119, which can be for example an EIDE hard disk.

The parallel interface 116 is also connected to an external connector 120 and to a modem 121 being also connected to an external connector 122. The serial communication interface 110 is connected to an external connector 123, and to the output of a infra-red reception module 124 which receives the signals coming from a infra-red remote control (not on the drawing).

The smart card interface 112 is connected to a smart card connector 125.

The video and audio decoder 113 is connected to a 16 Mbit memory 126, this memory storing the audio and video data not yet decoded. The decoder transmits the decoded video data to the PAL and RGB coder 114 and the decoded audio data to the analog to digital converter 127. The coder sends the RGB signals to a SECAM coder 132 and provides Iso a video signal, including a luminance data Y and a chrominance data C, both being separated. These data are multiplexed through a communication circuit 128 to audio outputs 129, to television 130 and video tape 131.

The invention claimed is:

1. A storage device for stream data and non-stream data, the storage device comprising:
    a hard disk organized into sectors;
    a random access file system configured to organize and store data on the hard disk, said random access file system being configured, at initialization and prior to data recording, to define two different logical data block sizes, respectively called first type of block and second type of block, as basic storage units for disk space allocation, each file to be stored being recorded aligned with a start address of a block on the hard disk, the first type of block comprising a first quantity of sectors configured to store audio or video streams, and the second type of block comprising a second quantity of sectors configured to store non-stream data, wherein there is one directory tree for both types of blocks, and the first quantity is a multiple of the size of the second quantity; and
    a demultiplexing and decoding circuit configured to allocate at least a block of the first type for storage of stream data, and when realizing room for storage of non-stream data, said demultiplexing and decoding circuit is configured both to split a block of the first type into a plurality of blocks of the second type and to allocate, for storage of said non-stream data, at least a part of said plurality of the blocks of the second type obtained from said splitting of the block of the first type.

2. The storage device according to claim 1 wherein a block of the first type split into a plurality of blocks of the second type can be, upon availability of all these blocks of the second type and according to the type of data to be stored, no more split into a plurality of blocks of a second type.

3. The storage device according to claim 1 wherein at least one first data structure indicates at least for each first type block whether the block is free or not, and whether the block is divided in a plurality of second type storage blocks or not.

4. The storage device according to claim 3 wherein a second data structure gives the availability of each storage block of the second type unit included in the storage block of the first type, the second data structure address being indicated in the first data structure.

5. The storage device according to claim 3 wherein the size and the number of the second data structures depend on the total amount of non- stream data the storage device has to store, the number of second data structures changes upon the allocation of a first type of storage block to a second type of storage block.

6. The storage device according to claim 3 wherein the second data structures are stored in at least one section of at least one storage block of a first type, and if more than one section is needed, each of the sections gives the address of the next section.

7. The storage device according to claim 6 wherein a third data structure is associated with each section storing the second data structures, the third data structure indicating the availability of the different second data structures of the section.

8. The storage device according to claim 6 wherein a first indicator is associated with each said section storing the second data structures, the indicator indicating if at least one second type storage block associated with the second data structures of the section, is available.

9. The storage device according to claim 6 wherein one new section storing the second data structures is allocated when the indicators associated with the sections already allocated indicate that no storage block of a second type is available and upon request of additional storage units for non-stream data.

10. The storage device according to claim 1 wherein a first file information structure is associated with each file stored, the file information structure indicating at least a file identifier, a file type, at least a field indicating the at least one location of the file on the hard disk and if the field cannot contain the whole location of the file, a pointer on a second file information structure.

11. The storage device according to claim 10 wherein the file information structures are stored in at least one section, and if more than one section is needed, each of the section gives the address of a next section.

12. The storage device according to claim 10 wherein the second file information structures are stored in at least one section, and if more than one section is needed, each of the section gives the address of a next section.

13. The storage device according to claim 10 wherein a third file information structure is associated with each section storing the first file information structures, the third file information structure indicating the availability of the different first file information structures of the section.

14. The storage device according to claim 10 wherein a fourth file information structure is associated with each section storing the second file information structures, the fourth file information structure indicating the availability of the different second file information structures of the section.

15. The storage device according to claim 10 wherein one second indicator is associated with each section storing the first file information structures, the second indicator indicating if at least one of the first file information structure is available.

16. The storage device according to claim 10 wherein one third indicator is associated with each section storing the second file information structures, the third indicator indicating if at least one of the second file information structures is available.

17. The storage device according to claim 10 wherein one new section storing the first information structures is allocated when the second indicators associated with the sections already allocated indicate that no first file information structure is available and upon storage of a new file.

18. The storage device according to claim 10 wherein one new section storing the second file information structures is allocated when the third indicators associated with the sections already allocated indicate that no second file information structure is available and upon storage of a new file the location of which cannot be contained in the field of its corresponding first file information structure.

19. The storage device according to claim 10 wherein the at least one field indicating the at least one location of the file on the hard disk indicates when the file contains audio and/or video streams, the address of the first storage block and the number of first storage blocks necessary to store the file and, when the file contains non-stream data, the address of the first storage block and the address of the second type storage block inside the first storage block.

20. The storage device according to claim 1 wherein it comprises one global data structure giving at least the addresses of the different sections, the size of the first storage blocks and the size of the second storage blocks.

21. A method for recording stream data and non-stream data on a random access storage medium, said method comprising:
   prior to data recording, defining two storage blocks types, respectively called first type block and second type block, which size of each represent a minimum space allocation when selected to store data, where the size of the first type block is at least one magnitude greater than that of the second type block;
   processing stream data or non-stream data blocks to prepare storage according to corresponding storage blocks, each file to be stored being recorded aligned with a start address of a block on the random access storage medium;
   if stream data is to be recorded, allocating a first type block on the random access storage medium for storage of said stream data; and
   if non-stream data is to be recorded, splitting a block of the first type into a plurality of blocks of the second type and allocating, for storage of said non-stream data, at least part of said plurality of the second type blocks realized from said splitting said block of the first type.

22. The method according to claim 21 wherein a block of the first type split into a plurality of blocks of the second type can be, upon availability of all these blocks of the second type and according to the type of data to be stored, no more split into a plurality of blocks of a second type.

23. The method according to claim 21 wherein at least one first data structure indicates at least for each first type block whether the block is free or not, and whether the block is divided in a plurality of second type storage blocks or not.

24. The method according to claim 23 wherein a second data structure gives the availability of each storage block of the second type unit included in the storage block of the first type, the second data structure address being indicated in the first data structure.

25. A random access storage device recording stream data and non-stream data, the random access storage device comprising:
   a storage device organized into sectors and configured to organize and store data, and comprising a random access file system being configured, at initialization and prior to data recording, to define two different logical data block sizes, respectively called first type of block and second type of block, as basic storage units for storage space allocation, each file to be stored being recorded aligned with a start address of a block on the storage device, the first type of block comprising a first quantity of sectors configured to store audio or video streams, and the second type of block comprising a second quantity of sectors configured to store non-stream data, wherein there is one directory tree for both types of blocks, and the first quantity is a multiple of the size of the second quantity; and
   processing circuitry configured to:
      allocate at least a block of the first type for storage of stream data,
      to split a block of the first type into a plurality of blocks of the second type when realizing room for storage of non-stream data, and
      to allocate, for storage of said non-stream data, at least a part of said plurality of the blocks of the second type obtained from the splitting of the block of the first type.

* * * * *